(12) United States Patent
Yan et al.

(10) Patent No.: US 12,277,299 B2
(45) Date of Patent: Apr. 15, 2025

(54) TOUCH DISPLAY MODULE AND DISPLAY APPARATUS

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Jun Yan, Beijing (CN); Xiangdan Dong, Beijing (CN); Tingliang Liu, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/576,669

(22) PCT Filed: May 4, 2023

(86) PCT No.: PCT/CN2023/092085
§ 371 (c)(1),
(2) Date: Jan. 4, 2024

(87) PCT Pub. No.: WO2023/246323
PCT Pub. Date: Dec. 28, 2023

(65) Prior Publication Data
US 2024/0310970 A1    Sep. 19, 2024

(30) Foreign Application Priority Data

Jun. 24, 2022  (CN) .......................... 202210727176.1

(51) Int. Cl.
G06F 3/047    (2006.01)
G06F 3/044    (2006.01)

(52) U.S. Cl.
CPC ............ G06F 3/047 (2013.01); G06F 3/0443 (2019.05)

(58) Field of Classification Search
CPC ............................... G06F 3/047; G06F 3/0443
See application file for complete search history.

(56) References Cited

U.S. PATENT DOCUMENTS

2017/0235389 A1*  8/2017  Liu ...................... G06F 3/0443
                                                        345/174
2017/0235396 A1*  8/2017  Gong .................. G02F 1/13338
                                                        349/12

(Continued)

FOREIGN PATENT DOCUMENTS

| CN | 103870080 A | 6/2014 |
| CN | 113268161 A | 8/2021 |

(Continued)

Primary Examiner — Sejoon Ahn
(74) Attorney, Agent, or Firm — XSENSUS LLP

(57) ABSTRACT

A touch display module includes a display panel, a touch structure and touch signal lines. The display panel has a display region, a first transition region, a bending region, a second transition region and a bonding region arranged in sequence in a first direction. The touch structure is formed with a touch region, the touch region covers the display region, and the first transition region is located on a side of the touch region in the first direction. The touch signal lines include wire sub-segments extending in a second direction, the second direction intersects the first direction; and in the wire sub-segments, part of the wire sub-segments are located in the first transition region, and part of the wire sub-segments are located in the second transition region.

17 Claims, 9 Drawing Sheets

(56) References Cited

U.S. PATENT DOCUMENTS

| | | | |
|---|---|---|---|
| 2017/0235400 A1* | 8/2017 | Ding | G06F 3/0412 |
| | | | 345/174 |
| 2017/0235404 A1* | 8/2017 | Grivna | G06F 3/0443 |
| | | | 345/174 |
| 2017/0235408 A1* | 8/2017 | Yang | G06F 3/0445 |
| | | | 345/174 |
| 2018/0253167 A1* | 9/2018 | Park | G06F 3/0445 |
| 2018/0260075 A1* | 9/2018 | Lai | G06F 3/0412 |
| 2018/0260602 A1* | 9/2018 | He | A61B 5/0075 |
| 2018/0261171 A1* | 9/2018 | Morein | G06F 3/0412 |
| 2023/0297195 A1 | 9/2023 | He et al. | |
| 2024/0170500 A1 | 5/2024 | Xu et al. | |

FOREIGN PATENT DOCUMENTS

| | | |
|---|---|---|
| CN | 113436541 A | 9/2021 |
| CN | 215494978 U | 1/2022 |
| CN | 114419996 A | 4/2022 |
| CN | 115202506 A | 10/2022 |

\* cited by examiner

TOUCH DISPLAY MODULE AND DISPLAY APPARATUS

CROSS-REFERENCE TO RELATED APPLICATIONS

This application is a national phase entry under 35 USC 371 of International Patent Application No. PCT/CN2023/092085, filed on May 4, 2023, which claims priority to Chinese Patent Application No. 202210727176.1, filed on Jun. 24, 2022, which are incorporated herein by reference in their entirety.

TECHNICAL FIELD

The present disclosure relates to the field of display technologies, and in particular, to a touch display module and a display apparatus.

BACKGROUND

With the development of display technologies, display apparatuses have gradually come throughout people's lives. Touch display apparatuses with the touch function are widely used in smart products such as mobile phones, televisions, and laptops due to the simple and convenient operation and providing users the better user experience.

Currently, a touch display apparatus includes: a display panel, a touch sensor used for implementing the touch function, a touch chip, touch signal lines, and a flexible circuit board. The touch chip can be disposed on the flexible circuit board, and be electrically connected to the touch sensor through the touch signal lines to transmit touch signals to the touch sensor and obtain sensing signals of the touch sensor.

SUMMARY

In an aspect, a touch display module is provided. The touch display module includes a display panel, a touch structure and a plurality of touch signal lines. The display panel has a display region, a first transition region, a bending region, a second transition region and a bonding region arranged in sequence in a first direction. The touch structure is formed with a touch region, the touch region covers the display region, and the first transition region is located on a side of the touch region in the first direction. The plurality of touch signal lines include a plurality of wire sub-segments extending in a second direction, the second direction intersects the first direction; and in the plurality of wire sub-segments, part of the wire sub-segments are located in the first transition region, and part of the wire sub-segments are located in the second transition region.

In some embodiments, the plurality of touch signal lines include a plurality of first touch wires and a plurality of second touch wires. The plurality of first touch wires are electrically connected to the touch structure on a first side of the touch region, and the first side is a side of the touch region proximate to the first transition region; a first touch wire includes a first wire sub-segment that extends in the second direction and is located in the first transition region. The plurality of second touch wires are electrically connected to the touch structure on a second side of the touch region, and the second side is at least one side of the touch region in the second direction; at least one second touch wire includes a second wire sub-segment that extends in the second direction and is located in the second transition region.

In some embodiments, the display panel includes a plurality of bonding parts disposed in the bonding region, and each bonding part includes a first bonding sub-part and two second bonding sub-parts; the first bonding sub-part includes a plurality of display pins, a second bonding sub-part of the two second bonding sub-parts includes a plurality of touch pins, and a touch signal line is electrically connected to a touch pin; and the two second bonding sub-parts are disposed on opposite sides of the first bonding sub-part in the second direction.

In some embodiments, the plurality of touch signal lines include a plurality of wire harnesses, and each wire harness is composed of touch signal lines connected to one second bonding sub-part. The plurality of wire harnesses include a plurality of first wire harnesses and a plurality of second wire harnesses; each first wire harness is composed of first touch wires, and each second wire harness is composed of second touch wires; and the plurality of second wire harnesses are located on opposite sides of the plurality of first wire harnesses.

In some embodiments, the plurality of second wire harnesses include a plurality of first sub-harnesses, and a first sub-harness is composed of at least one second touch wire. The first sub-harness includes a first sub-harness segment, a second sub-harness segment, a third sub-harness segment, a fourth sub-harness segment, and a fifth sub-harness segment that are connected in sequence. An end of the first sub-harness segment is electrically connected to a second bonding sub-part of a bonding part, and another end of the first sub-harness segment extends to the second transition region in the first direction; the second sub-harness segment extends in the second direction and is located in the second transition region; the third sub-harness segment extends to the first transition region in the first direction; the fourth sub-harness segment extends in the second direction and is located in the first transition region; and the fifth sub-harness segment extends in the first direction and is electrically connected to the touch structure on a side of the touch region in the second direction.

In some embodiments, the plurality of second wire harnesses further include a plurality of second sub-harnesses, and a second sub-harness is composed of at least one second touch wire. The second sub-harness includes a sixth sub-harness segment, a seventh sub-harness segment, and an eighth sub-harness segment that are connected in sequence. An end of the sixth sub-harness segment is electrically connected to a second bonding sub-part of a bonding part, and another end of the sixth sub-harness segment extends to the first transition region in the first direction; the seventh sub-harness segment extends in the second direction and is located in the first transition region; and the eighth sub-harness segment extends in the first direction and is electrically connected to the touch structure on a side of the touch region in the second direction.

In some embodiments, the second sub-harness is located on a side of the first sub-harness away from the plurality of first wire harnesses.

In some embodiments, the plurality of first wire harnesses include two third sub-harnesses, and a third sub-harness includes a first wire cluster and a second wire cluster that are arranged in parallel. The first wire cluster includes a first wire cluster segment and a second wire cluster segment. An end of the first wire cluster segment is electrically connected to a second bonding sub-part of a bonding part, and another end of the first wire cluster segment extends to the first transition region in the first direction. The second wire cluster segment extends in the second direction to a border of the display region and is located in the first transition region, and the second wire cluster segment is electrically connected to the touch structure. The second wire cluster includes a third wire cluster segment and a fourth wire cluster segment. An end of the third wire cluster segment is electrically connected to a second bonding sub-part of a bonding part, and another end of the third wire cluster segment extends to the first transition region in the first direction. The fourth wire cluster segment extends in the second direction and is located on a side of the third sub-harness segment away from the fifth sub-harness segment; and the fourth wire cluster segment is located in the first transition region and is electrically connected to the touch structure.

In some embodiments, the second wire cluster is located between the first wire cluster and the first sub-harness.

In some embodiments, the plurality of first wire harnesses further include a plurality of fourth sub-harnesses, and a fourth sub-harness includes a ninth sub-harness segment and a tenth sub-harness segment that are connected in sequence. An end of the ninth sub-harness segment is electrically connected to a second bonding sub-part of a bonding part, and another end of the ninth sub-harness segment extends to the first transition region in the first direction; and the tenth sub-harness segment extends in the second direction and is electrically connected to the touch structure in the first transition region.

In some embodiments, the two third sub-harnesses are disposed on opposite sides of the plurality of fourth sub-harnesses, respectively.

In some embodiments, the plurality of bonding parts include a first bonding part, a second bonding part, a third bonding part and a fourth bonding part that are arranged in sequence in the second direction.

A second bonding sub-part, farther away from the fourth bonding part, of the first bonding part is electrically connected to a second sub-harness of the plurality of second sub-harnesses; and a second bonding sub-part, closer to the fourth bonding part, of the first bonding part is electrically connected to a first sub-harness of the plurality of first sub-harnesses.

A second bonding sub-part, farther away from the fourth bonding part, of the second bonding part is electrically connected to a third sub-harness of the two third sub-harnesses; and a second bonding sub-part, closer to the fourth bonding part, of the second bonding part is electrically connected to a fourth sub-harness of the plurality of fourth sub-harnesses.

A second bonding sub-part, farther away from the first bonding part, of the third bonding part is electrically connected to a third sub-harness of the two third sub-harnesses; and a second bonding sub-part, closer to the first bonding part, of the third bonding part is electrically connected to a fourth sub-harness of the plurality of fourth sub-harnesses.

A second bonding sub-part, farther away from the first bonding part, of the fourth bonding part is electrically connected to a second sub-harness of the plurality of second sub-harnesses; and a second bonding sub-part, closer to the first bonding part, of the fourth bonding part is electrically connected to a first sub-harness of the plurality of first sub-harnesses.

In some embodiments, the display panel has a first symmetry axis extending in the first direction, and the first wire harness and the second wire harness are symmetrically arranged relative to the first symmetry axis.

In some embodiments, the touch structure includes driving electrodes and sensing electrodes. The first touch wire is electrically connected to a sensing electrode, and the second touch wire is electrically connected to a driving electrode; or the first touch wire is electrically connected to the driving electrode, and the second touch wire is electrically connected to the sensing electrode.

In some embodiments, the display panel further includes a plurality of data connection lines and a plurality of power supply connection lines. The data connection lines are disposed on a side of the display region proximate to the bonding region. The plurality of power supply connection lines are disposed on at least one side of the display region. In the plurality of touch signal lines, an orthographic projection of a wire sub-segment located in the second transition region on a reference plane at least partially overlaps with an orthographic projection of a power supply connection line on the reference plane. A film layer where the plurality of power supply connection lines are located is located between a film layer where the plurality of data connection lines are located and a film layer where the plurality of touch signal lines are located. The reference plane is a plane defined by the first direction and the second direction.

In some embodiments, the plurality of power supply connection lines include first power supply connection lines and second power supply connection lines, and the first power supply connection lines and the second power supply connection lines each are at least partially located in the second transition region.

In the plurality of touch signal lines, an orthographic projection, on the reference plane, of a set line segment of a wire sub-segment extending in the second direction located in the second transition region is located within a range of an orthographic projection of a first power supply connection line on the reference plane.

In the plurality of touch signal lines, an orthographic projection, on the reference plane, of a set line segment of a wire sub-segment extending in the first direction located in the second transition region is located within a range of an orthographic projection of a second power supply connection line on the reference plane.

In some embodiments, the display panel includes a plurality of bonding parts disposed in the bonding region, and each bonding part includes a first bonding sub-part; the first bonding sub-part includes a plurality of display pins, and the plurality of display pins include two first power supply pin groups arranged at an interval. Each first power supply pin group includes at least one first power supply pin.

The first power supply connection line includes a first connection sub-segment, a second connection sub-segment and a third connection sub-segment that are connected in sequence. The first connection sub-segment and the third connection sub-segment extend in the first direction, and are connected to the two first power supply pin groups, respectively. The second connection sub-segment extends in the second direction. In the plurality of touch signal lines, the orthographic projection, on the reference plane, of the set line segment of the wire sub-segment extending in the second direction located in the second transition region is located within a range of an orthographic projection of the second connection sub-segment on the reference plane.

In some embodiments, the display panel includes a plurality of bonding parts disposed in the bonding region, and each bonding part includes a first bonding sub-part; the first bonding sub-part includes a plurality of display pins, and the plurality of display pins include two second power supply pin groups arranged at an interval. Each second power supply pin group includes at least one second power supply pin.

The second power supply connection line includes a fourth connection sub-segment and a fifth connection sub-segment that are connected in sequence. The fourth connection sub-segment extends in the first direction. An end of the fifth connection sub-segment is connected to the fourth connection sub-segment, and another end of the fifth connection sub-segment is electrically connected to a second power supply pin group. In the plurality of touch signal lines, the orthographic projection, on the reference plane, of the set line segment of the wire sub-segment extending in the first direction located in the second transition region is located within a range of an orthographic projection of the fourth connection sub-segment on the reference plane.

In some embodiments, in a third direction, the display panel includes a substrate, a first gate conductive layer, a second gate conductive layer, a first source-drain conductive layer, a second source-drain conductive layer, and a touch sensing layer. The third direction is perpendicular to the plane defined by the first direction and the second direction. The data connection lines are located in the first gate conductive layer and/or the second gate conductive layer. The power supply connection lines are located in the first source-drain conductive layer and/or the second source-drain conductive layer. The plurality of touch signal lines are located in the touch sensing layer.

In another aspect, a display apparatus is provided. The display apparatus includes the touch display module as described in any of the above embodiments.

BRIEF DESCRIPTION OF THE DRAWINGS

In order to describe technical solutions in the present disclosure more clearly, the accompanying drawings to be used in some embodiments of the present disclosure will be introduced briefly; Obviously, the accompanying drawings to be described below are merely drawings of some embodiments of the present disclosure, and a person of ordinary skill in the art can obtain other drawings according to those drawings. In addition, the accompanying drawings to be described below may be regarded as schematic diagrams, but are not limitations on actual sizes of products, actual processes of methods and actual timings of signals involved in the embodiments of the present disclosure.

DETAILED DESCRIPTION

Figure 1:
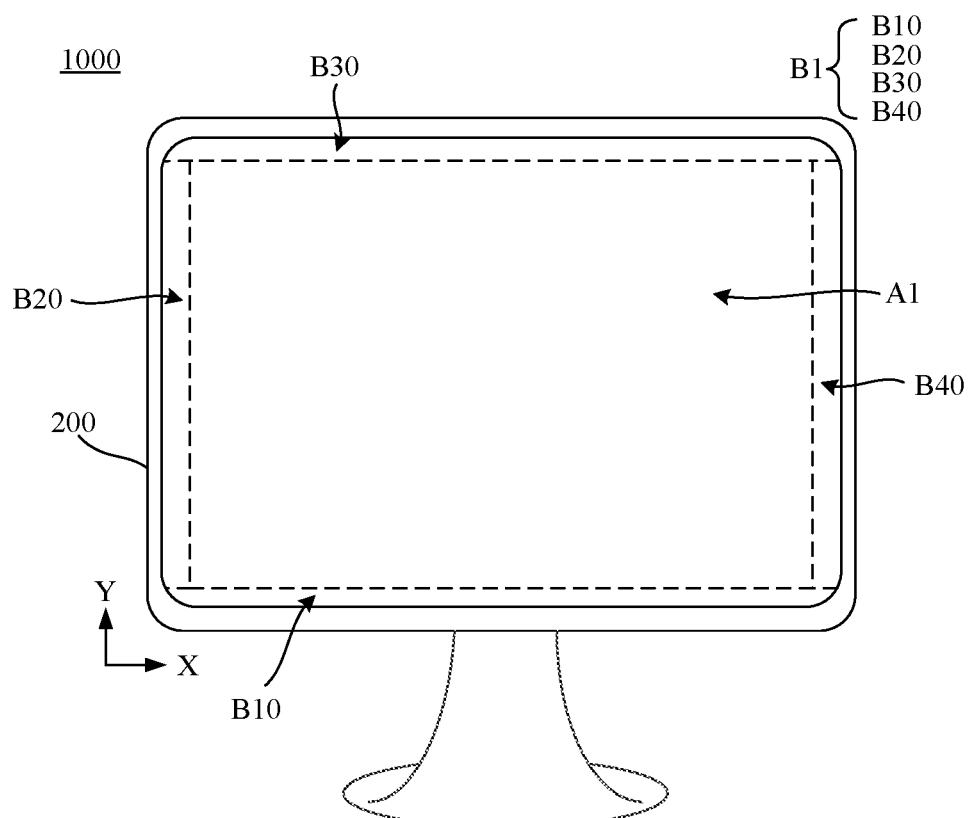
FIG. 1 is a structural diagram of a display apparatus, in accordance with some embodiments.

The technical solutions in some embodiments of the present disclosure will be described clearly and completely with reference to the accompanying drawings. Obviously, the described embodiments are merely some but not all embodiments of the present disclosure. All other embodiments obtained by a person of ordinary skill in the art based on embodiments of the present disclosure shall be included in the protection scope of the present disclosure.

Unless the context requires otherwise, throughout the specification and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment," "some embodiments," "exemplary embodiments," "example," "specific example," or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

The terms "first" and "second" are used for descriptive purposes only, and are not to be construed as indicating or implying a relative importance or implicitly indicating a number of indicated technical features. Therefore, the feature defined with "first" or "second" may explicitly or implicitly include one or more of the features. In the description of the embodiments of the present disclosure, the term "a plurality of" or "the plurality of" means two or more unless otherwise specified.

In the description of some embodiments, the expressions "coupled" and "connected" and derivatives thereof may be used. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the contents herein.

The phrase "at least one of A, B, and C" has the same meaning as the phrase "at least one of A, B, or C", and they both include the following combinations of A, B, and C: only A, only B, only C, a combination of A and B, a combination of A and C, a combination of B and C, and a combination of A, B, and C.

The phrase "A and/or B" includes the following three combinations: only A, only B, and a combination of A and B.

As used herein, the term "if" is optionally construed as "when" or "in a case where" or "in response to determining" or "in response to detecting", depending on the context. Similarly, depending on the context, the phrase "if it is determined" or "if [a stated condition or event] is detected" is optionally construed as "in a case where it is determined" or "in response to determining" or "in a case where [the stated condition or event] is detected" or "in response to detecting [the stated condition or event]".

The phrase "applicable to" or "configured to" used herein means an open and inclusive expression, which does not exclude devices that are applicable to or configured to perform additional tasks or steps.

Additionally, the phase "based on" used is meant to be open and inclusive, since a process, step, calculation or other action that is "based on" one or more of the stated conditions or values may, in practice, be based on additional conditions or value exceeding those stated.

The term such as "parallel", "perpendicular", or "equal" as used herein includes a stated condition and a condition similar to the stated condition. A range of the similar condition is within an acceptable range of deviation, and the acceptable range of deviation is determined by a person of ordinary skill in the art, considering measurement in question and errors associated with measurement of a particular quantity (i.e., the limitations of a measurement system). For example, the term "parallel" includes absolute parallelism and approximate parallelism, and an acceptable range of deviation of the approximate parallelism may be, for example, a deviation within 5°. The term "perpendicular" includes absolute perpendicularity and approximate perpendicularity, and an acceptable range of deviation of the approximate perpendicularity may also be, for example, a deviation within 5°. The term "equal" includes absolute equality and approximate equality, and an acceptable range of deviation of the approximate equality may be, for example, that a difference between two equals is less than or equal to 5% of either of the two equals.

It will be understood that, when a layer or element is referred to as being on another layer or substrate, it may be that the layer or element is directly on the another layer or substrate, or it may be that intervening layer(s) exist between the layer or element and the another layer or substrate.

Exemplary embodiments are described herein with reference to sectional views and/or plan views as idealized exemplary drawings. In the accompanying drawings, thicknesses of layers and sizes of regions may be exaggerated for clarity. Thus, variations in shape with respect to the drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown to have a rectangular shape generally has a curved feature. Therefore, the regions shown in the accompanying drawings are schematic in nature, and their shapes are not intended to show actual shapes of regions in an apparatus, and are not intended to limit the scope of the exemplary embodiments.

Referring to FIG. 1, some embodiments of the present disclosure provide a display apparatus 1000, and the display apparatus 1000 may be any apparatus that displays an image whether in motion (e.g., a video) or stationary (e.g., a still image), and whether textual or graphical. For example, the display apparatus 1000 may be any product or component having a display function, such as a television, a laptop computer, a tablet computer, a mobile phone, a personal digital assistant (PDA), a navigator, a wearable device, an augmented reality (AR) device, a virtual reality (VR) device.

The display apparatus 1000 may be an electroluminescent display apparatus or a photoluminescence display apparatus. In a case where the display apparatus 1000 is the electroluminescent display apparatus, the electroluminescent display apparatus may be an organic light-emitting diode (OLED) display apparatus or a quantum dot light-emitting diode (QLED) display apparatus. In a case where the display apparatus 1000 is the photoluminescence display apparatus, the photoluminescence display apparatus may be a quantum dot photoluminescence display apparatus.

Some embodiments of the present disclosure will be schematically described below by taking an example in which the display apparatus 1000 is the OLED display apparatus.

Figure 2A:
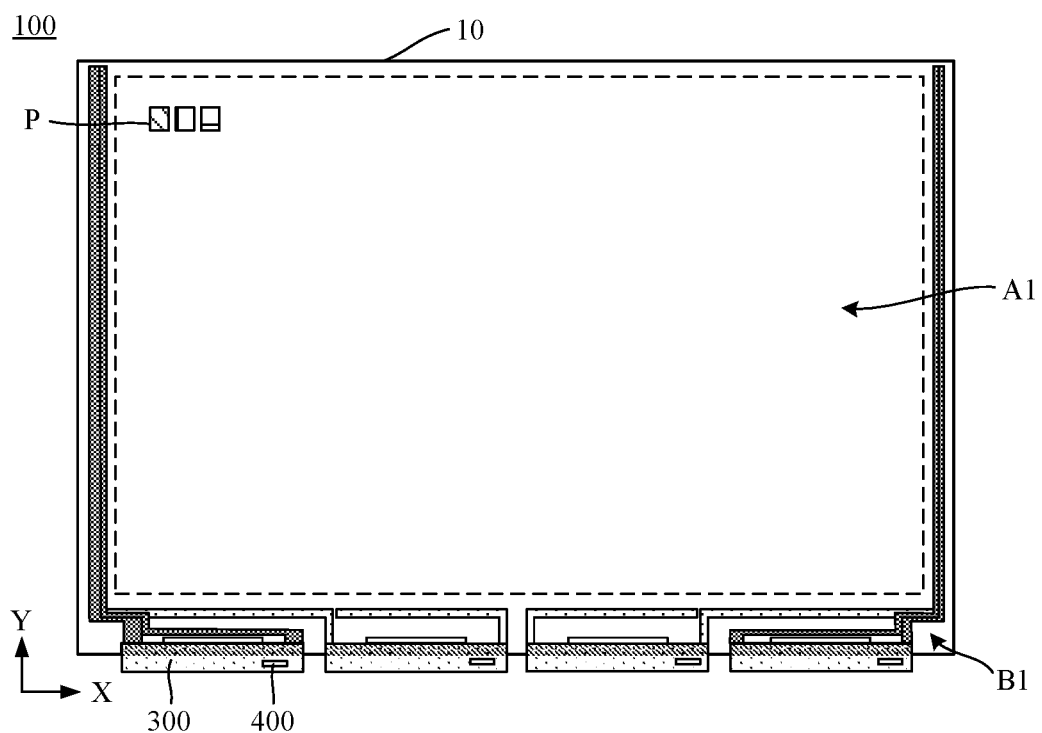
FIG. 2A is a structural diagram of a touch display module, in accordance with some embodiments.

In some embodiments, referring to FIGS. 1 and 2A, the display apparatus 1000 includes a touch display module 100.

For example, as shown in FIGS. 1 and 2A, the display apparatus 1000 may further include a housing 200, and the touch display module 100 may be disposed in the housing 200.

Figure 3A:
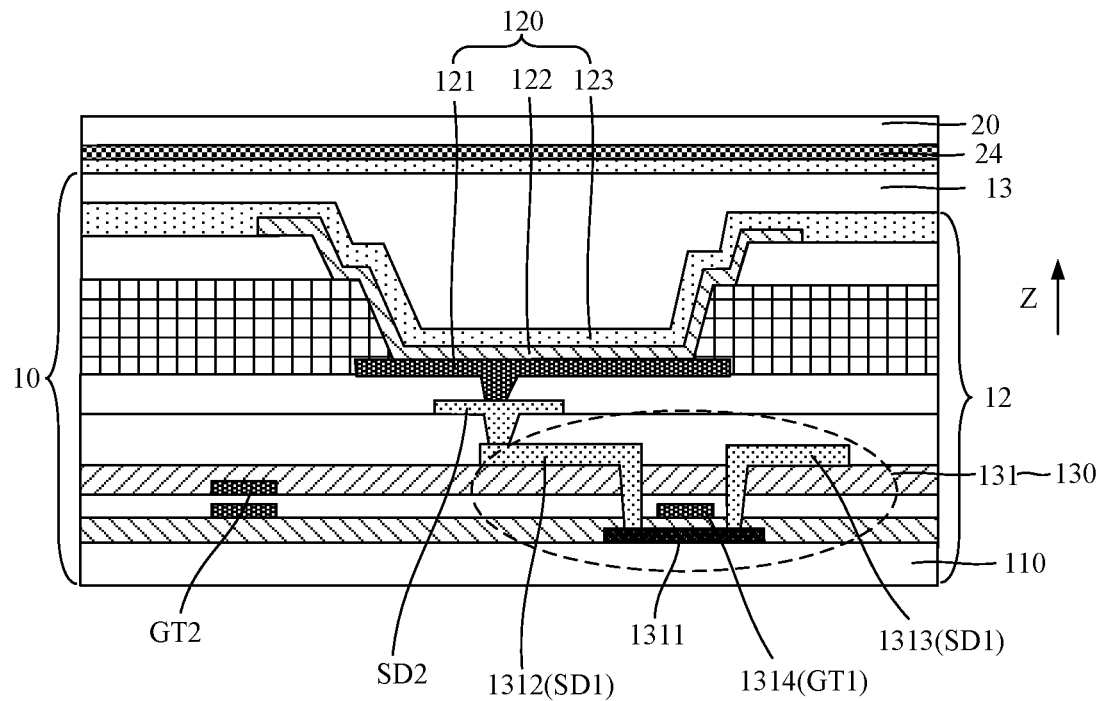
FIG. 3A is a sectional view of a touch display module, in accordance with some embodiments.

In some embodiments, as shown in FIGS. 2A and 3A, the touch display module 100 may include a display panel 10 and a touch sensing layer 20.

For example, as shown in FIG. 2A, the touch display module 100 may further include flexible circuit board(s) 300, touch chip(s) 400, and other electronic accessories. The touch chip 400 can be disposed on the flexible circuit board 300, and the flexible circuit board 300 can be bonded to the display panel 10 at an end of the display panel 10.

It should be noted that the display panel 10 has a light-exit surface and a non-light-exit surface that are opposite. The light-exit surface refers to a surface of the display panel 10 for displaying images (an upper side of the display panel 10 in FIG. 3A), and the non-light-exit surface refers to another surface opposite to the light-exit surface.

Figure 3B:
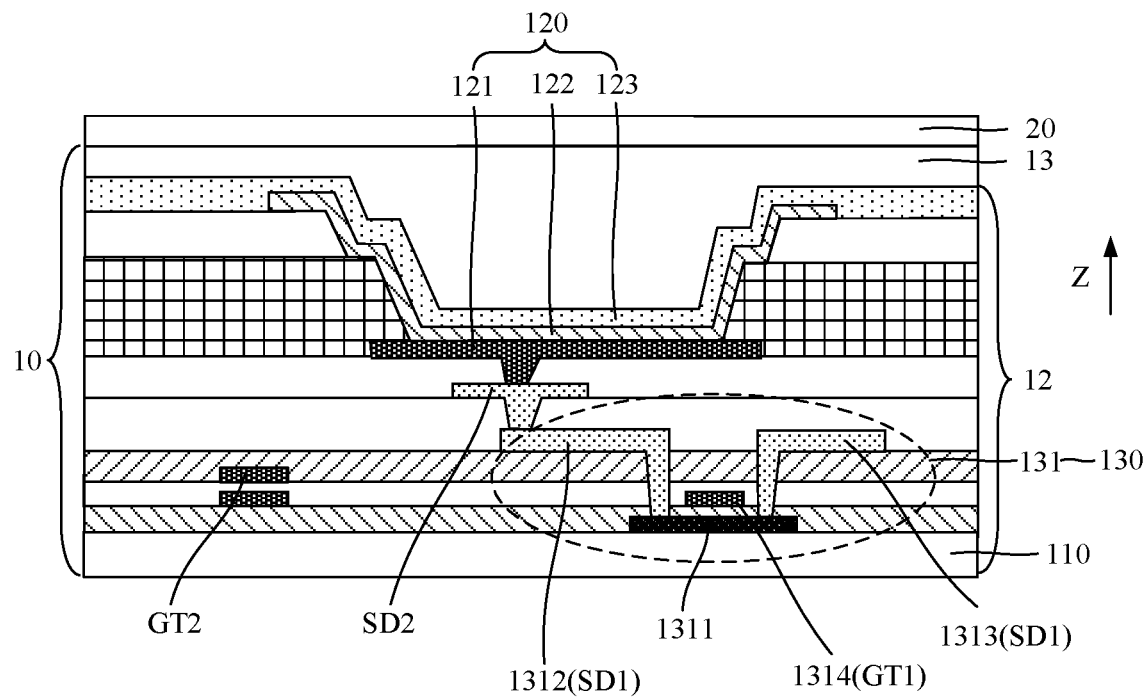
FIG. 3B is a sectional view of another touch display module, in accordance with some embodiments.

In some embodiments, referring to FIGS. 3A and 3B, the touch sensing layer 20 is disposed on a side of the light-exit surface of the display panel 10.

For example, as shown in FIG. 3A, the touch sensing layer 20 is separately fabricated on a transparent substrate 24 and then bonded to the light-exit surface of the display panel 10.

For example, as shown in FIG. 3B, the touch sensing layer 20 is directly formed on the light-exit surface of the display panel 10. That is, the display panel 10 is used as a substrate for supporting the touch sensing layer 20, which is beneficial to the lightness and thinness of the display apparatus 1000 (see FIG. 1).

Some embodiments of the present disclosure are schematically described below by taking an example in which the touch sensing layer 20 is directly formed on the light-exit surface of the display panel 10.

In some embodiments, referring to FIGS. 3A and 3B, the display panel 10 includes a display substrate 12 and an encapsulation layer 13 for encapsulating the display substrate 12.

As shown in FIGS. 3A and 3B, the display substrate 12 has a light-exit surface and the non-light-exit surface that are oppositely arranged, and the encapsulation layer 13 is disposed on the light-exit surface of the display substrate 12. Here, the encapsulation layer 13 may be an encapsulation film or an encapsulation substrate.

Figure 2B:
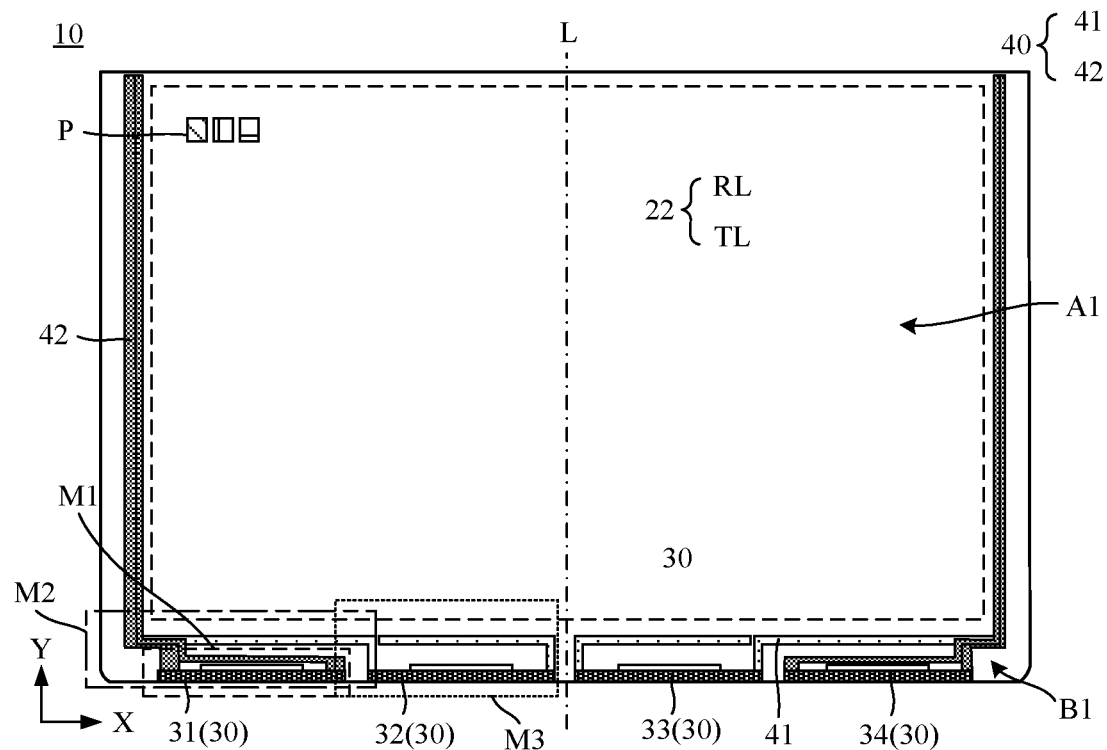
FIG. 2B is a structural diagram of a display panel, in accordance with some embodiments.

As shown in FIGS. 1 and 2B, the display panel 10 has a display region A1 and a peripheral region A2 located on at least one side of the display region A1. FIGS. 1 and 2B illustrate an example in which the display region A1 is surrounded by the peripheral region B1.

Referring to FIG. 2B, the display region A1 is a region for displaying images, and the display region A1 may be configured such that sub-pixels P are provided therein.

For example, as shown in FIGS. 2B and 3B, the display panel 10 includes a substrate 110 and a plurality of sub-pixels P disposed on a side of the substrate 110 and located in the display region A1.

A type of the substrate 110 varies, which may be selected according to actual needs.

For example, the substrate 110 can be a rigid substrate. For example, the rigid substrate can be a glass substrate or a polymethyl methacrylate (PMMA) substrate.

For example, the substrate 110 can be a flexible substrate. For example, the flexible substrate can be a polyethylene terephthalate (PET) substrate, a polyethylene naphthalate two formic acid glycol ester (PEN) substrate, or a polyimide (PI) substrate.

Referring to FIG. 3B, each sub-pixel P includes a light-emitting device 120 and a pixel circuit 130 that are disposed on the substrate 110. The pixel circuit 130 includes a plurality of thin film transistors 131.

As shown in FIG. 3B, the thin film transistor 131 includes an active layer 1311, a source 1312, a drain 1313 and a gate 1314, and the source 1312 and the drain 1313 are in contact with the active layer 1311.

It should be noted that the source 1312 and drain 1313 can be interchanged; that is, 1312 in FIG. 3B represents the drain, and 1313 in FIG. 3B represents the source.

As shown in FIG. 3B, the light-emitting device 120 includes a first electrode 121, a light-emitting functional layer 122 and a second electrode 123, and the first electrode 121 is electrically connected to the source 1312 or the drain 1313 of a thin film transistor 131 in the plurality of thin film transistors 131, which serves as a driving transistor. FIG. 3B illustrates an example in which the first electrode 121 is electrically connected to the source 1312 of the thin film transistor 131.

It should be noted that the second electrodes 123 can constitute a continuous whole-layer pattern, for example, covering the display region A1 and extending to a first transition region B11. Here, descriptions of the display region A1 and the first transition region B11 may be referred to below.

Here, the first electrode 121 is an anode of the light-emitting device 120, and the second electrode 123 is a cathode of the light-emitting device 120; alternatively, the first electrode 121 is the cathode of the light-emitting device 120, and the second electrode 123 is the anode of the light-emitting device 120. Some embodiments of the present disclosure are schematically described below by taking an example where the first electrode 121 is the anode of the light-emitting device 120, and the second electrode 123 is the cathode of the light-emitting device 120.

Referring to FIG. 2B, the peripheral region B1 is a region that does not display an image, and the peripheral region B1 may be configured such that scan driving circuit(s), circuit wires, and bonding parts 30 are provided therein.

For example, referring to FIG. 1, the peripheral region B1 surrounds the display region A1 and includes a first frame region B10, a second frame region B20, a third frame region B30 and a fourth frame region B40 that are sequentially connected end to end.

The first frame region B10 and the third frame region B30 are located on opposite sides of the display region A1 in a first direction Y, and the second frame region B20 and the fourth frame region B40 are located on opposite sides of the display region A1 in a second direction X.

Figure 4:
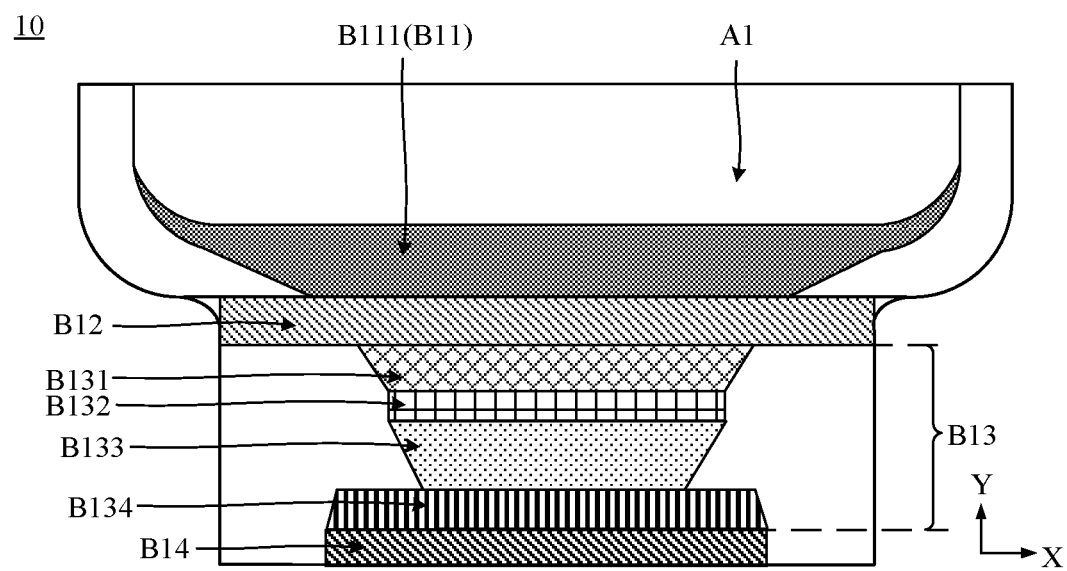
FIG. 4 is a partial enlargement view of a peripheral region of a display panel, in accordance with some embodiments.

Referring to FIGS. 1 and 4, the first frame region B10 can include the first transition region B11, a bending region B12, a second transition region B13 and a bonding region B14. The display region A1, the first transition region B11, the bending region B12, the second transition region B13 and the bonding region B14 are arranged in sequence in the first direction Y.

It should be noted that the first transition region B11 can include, for example, a first fan-out region B111. The second transition region B13 can include, for example, a second fan-out region B131. The second transition region B13 can further include an electrostatic protection region B132, a third fan-out region B133 and a chip arrangement region B134 that are disposed on a side of the second fan-out region B131 away from the display region A1.

On this basis, referring to FIGS. 2B and 4, the bonding part 30 is disposed in the bonding region B14, and the above-mentioned flexible circuit board can be electrically connected to the bonding part 30 in the bonding region B14.

Here, in order to improve the bonding yield, as shown in FIGS. 2A, 2B and 4, a plurality of bonding parts 30 can be provided in the bonding region B14, and the plurality of bonding parts 30 are arranged at intervals in the second direction X, and are bonded to the flexible circuit board 300.

Figure 7:
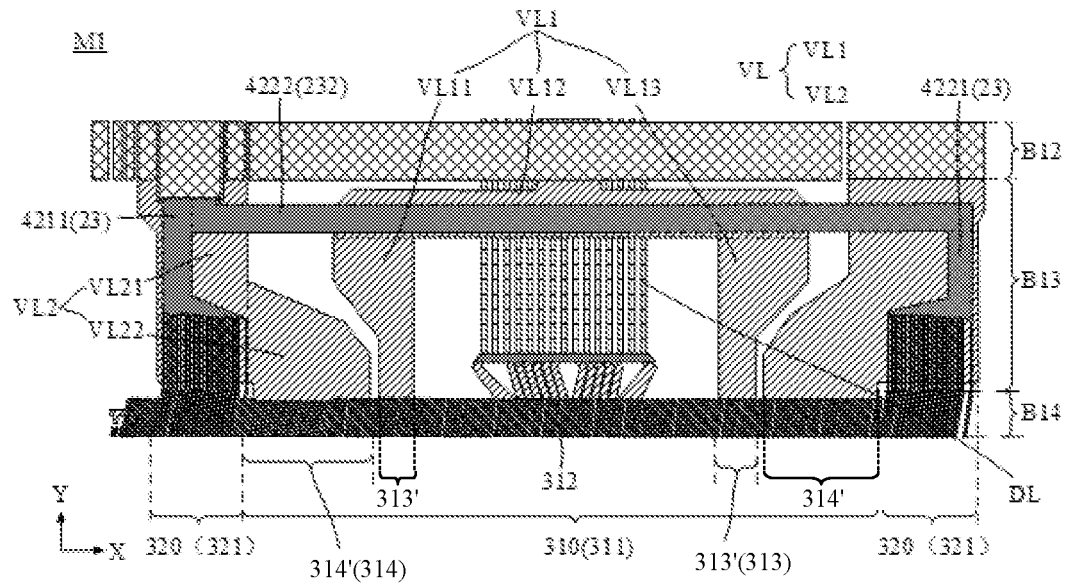
FIG. 7 is a partial enlargement view of the region M1 in FIG. 2B.

In some examples, as shown in FIGS. 2 and 7, each bonding part 30 can include a first bonding sub-part 310 and two second bonding sub-parts 320.

Referring to FIG. 7, the first bonding sub-part 310 includes a plurality of display pins 311 configured to transmit power supply signals and/or display data signals. For example, the plurality of display pins 311 include data pins 312, first power supply pin(s) 313, and second power supply pin(s) 314. The data pin 312 is configured to transmit a display data signal, the first power supply pin 313 is configured to transmit a first power supply voltage signal Vdd, and the second power supply pin 314 is configured to transmit a second power supply voltage signal Vss.

Referring to FIG. 7, the second bonding sub-part 320 includes a plurality of touch pins 321, and the touch pins 321 are electrically connected to the touch chip 400 (see FIG. 2A). The touch pin 321 is configured to transmit a touch driving signal and/or a touch sensing signal. The two second bonding sub-parts 320 are disposed on opposite sides of the first bonding sub-part 310 in the second direction X.

Figure 5A:
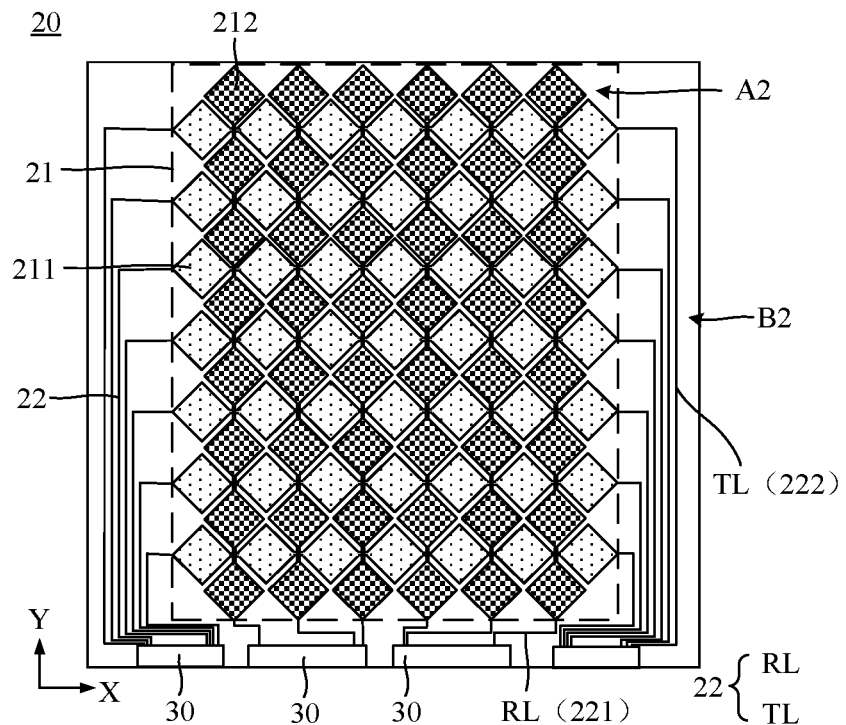
FIG. 5A is a structural diagram of a touch sensing layer, in accordance with some embodiments.
Figure 6A:
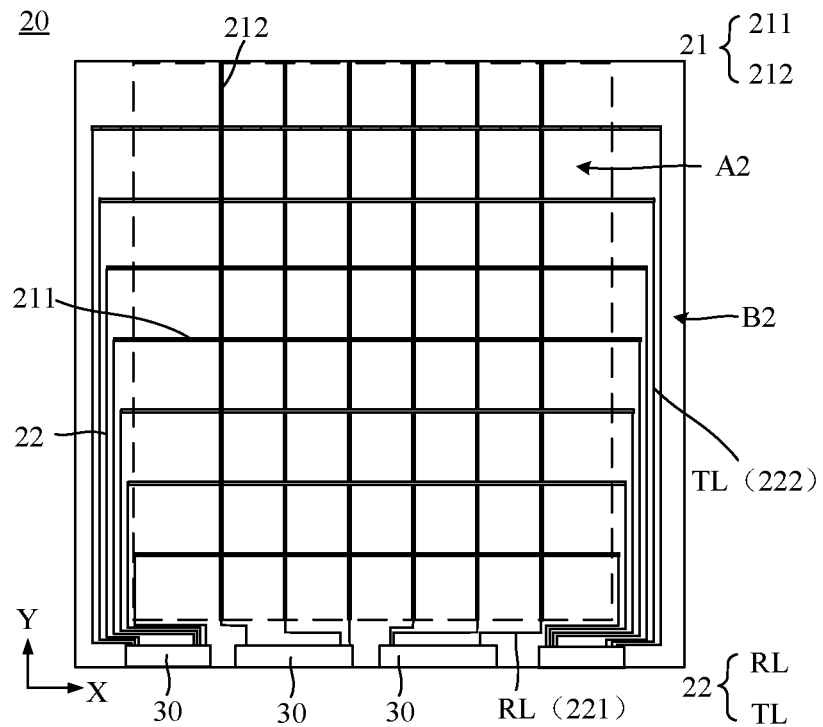
FIG. 6A is a structural diagram of yet another touch sensing layer, in accordance with some embodiments.

As shown in FIGS. 5A and 6A, the touch sensing layer 20 has a touch region A2 and a wiring region B2 located on at least one side of the touch region A2. FIGS. 5A and 6A are illustrated by taking an example in which the wiring region B2 is located on a left side, right side and lower side of the touch region A2.

Referring to FIGS. 5A and 6A, the touch region A2 is a region capable of receiving touch operations, and the touch region A2 can cover the display region A1. The touch region A2 is configured such that a touch structure 21 is provided therein.

For example, the touch sensing layer 20 includes a touch structure 21 formed with a touch region A2 and located within the touch region A2. The touch structure 21 includes a plurality of driving electrodes 211 and a plurality of sensing electrodes 212 that cross each other and are insulated from each other.

Figure 5B:
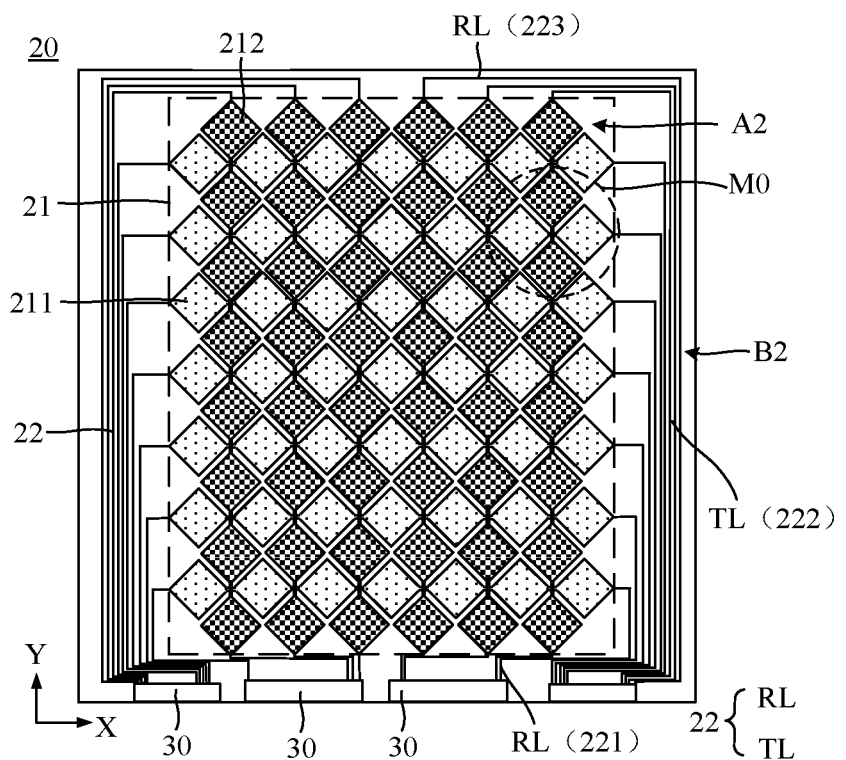
FIG. 5B is a structural diagram of another touch sensing layer, in accordance with some embodiments.
Figure 5C:
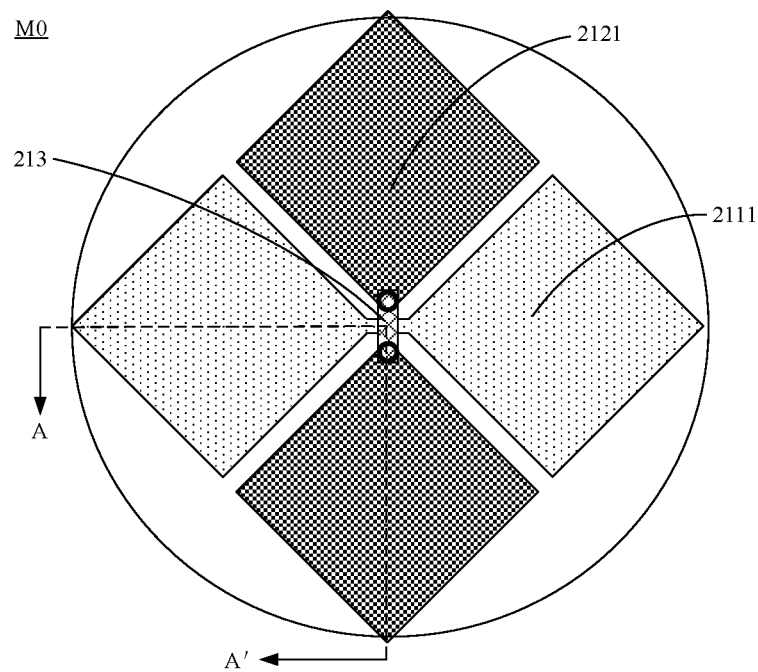
FIG. 5C is a partial enlargement view of the region M0 in FIG. 5B.

In some embodiments, as shown in FIGS. 5A and 5C, the plurality of driving electrodes 211 are arranged in the first direction Y, and each driving electrode 211 includes a plurality of driving electrode blocks 2111 connected in series; the plurality of sensing electrodes 212 are arranged in the second direction X, and each sensing electrode 212 includes a plurality of sensing electrode blocks 2121 connected in series. The first direction Y intersects the second direction X. For example, the first direction X is perpendicular to the second direction Y.

In some other embodiments, as shown in FIG. 6A, the driving electrode 211 is a first conductive line extending in the second direction X, and the sensing electrode 212 is a second conductive line extending in the first direction Y. The plurality of first conductive lines are arranged in the first direction Y, and the plurality of second conductive lines are arranged in the second direction X. Here, the plurality of first conductive lines and the plurality of second conductive lines may be located between the plurality of sub-pixels P, so as to avoid blocking the light emitted by the light-emitting device 120.

The way in which the plurality of driving electrodes 211 and the plurality of sensing electrodes 212 are insulated from each other is not unique.

Figure 5D:
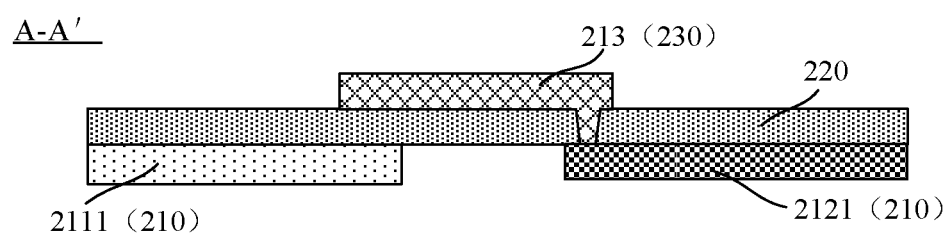
FIG. 5D is a sectional view taken along line A-A' in FIG. 5C.

In some embodiments, referring to FIGS. 5A, 5C and 5D, portions of the plurality of driving electrodes 211 and portions of the plurality of sensing electrodes 212 that are not overlapped are located in the same layer, and portions of the plurality of driving electrodes 211 and portions of the plurality of sensing electrodes 212 that are overlapped are located in different layers.

For example, as shown in FIG. 5D, the touch sensing layer 20 includes a first conductive layer 210, an insulating layer 220 and a second conductive layer 230. The first conductive layer 210 and the second conductive layer 230 are disposed on opposite sides of the insulating layer 220.

Referring to FIGS. 5B, 5C and 5D, each driving electrode 211 includes the plurality of driving electrode blocks 2111, and each driving electrode 211 is of a one-piece structure. Each sensing electrode 212 includes the plurality of sensing electrode blocks 2121 arranged at intervals and a plurality of bridge portions 213, every two adjacent sensing electrode blocks 2121 are electrically connected through a bridge portion 213.

In this case, all the driving electrodes 211 and all the sensing electrode blocks 2121 are located in the first conductive layer 210, and all the bridge portions 213 are located in the second conductive layer 230.

It should be noted that, the description that each driving electrode 211 is of a one-piece structure means that portions of each driving electrode 211 are all located in the same layer and are directly connected together.

Some embodiments of the present disclosure will be schematically described below by taking an example in which the driving electrode 211 is the first conductive line extending in the second direction X and the sensing electrode 212 is the second conductive line extending in the first direction Y.

Referring to FIGS. 2B and 6A, the wiring region B2 is a region that cannot receive touch operations, and the wiring region B2 can be located in the peripheral region B1. The wiring region B2 is configured such that touch signal lines 22 are provided therein.

For example, as shown in FIG. 6A, the touch sensing layer 20 includes a plurality of touch signal lines 22, the plurality of touch signal lines 22 are disposed in the wiring region B2, and the touch signal lines 22 are connected to the touch structure 21 and the touch pins 321 (see FIG. 7). The plurality of touch signal lines 22 include first touch signal lines RL arranged at intervals and second touch signal lines TL arranged at intervals. The first touch signal lines RL are electrically connected to the touch chip 400 (see FIG. 1) and the sensing electrodes 212, and are configured to transmit touch sensing signals. The second touch signal lines TL are electrically connected to the touch chip 400 (see FIG. 1) and the driving electrodes 211, and are configured to transmit touch driving signals.

In this case, the driving electrode 211 and the sensing electrode 212 can form a capacitive node. By applying a pulse or alternating voltage to the driving electrode 211 through the touch chip 400 (see FIG. 1), charges may be induced on the sensing electrode 212, and the amount of induced charges may be easily influenced by external factors (such as finger touch or approach). That is, when a finger touches or approaches the capacitive node, capacitance can change at the capacitive node, and the touch chip 400 (see FIG. 1) can measure the capacitance change through the sensing electrode 212, and determine a location where the finger touches or approaches by measuring the capacitance changes of the entire touch structure 21.

In the related art, in order to meet the user's requirement for the narrow bezel, an area of the first transition region B11 is reduced; and since the plurality of touch signal lines 22 each have a wire sub-segment extending in the second direction X in the first transition region B11, an overall area occupied by wire sub-segments extending in the second direction X in the first transition region B11 is increased (that is, a wire width (cross-section) of the plurality of touch signal lines 22 is increased). As a result, the impedance of the touch signal line 22 increases, causing the touch performance of the display apparatus 1000 to be reduced and failing to meet customer requirements.

Figure 10:
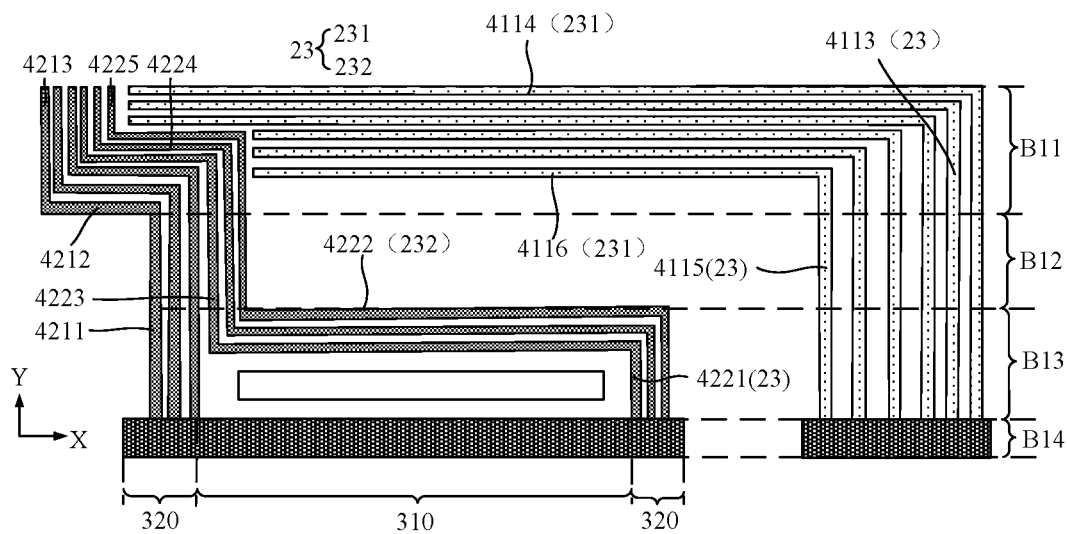
FIG. 10 is a wiring diagram of a wire harness in FIG. 8.
Figure 11:
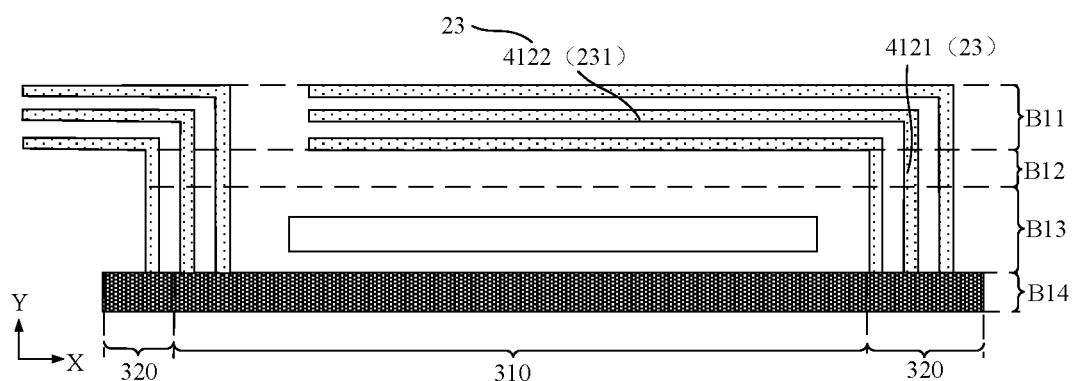
FIG. 11 is a wiring diagram of a wire harness in FIG. 9.

Based on this, in the touch display module provided in some embodiments of the present disclosure, referring to FIGS. 6A, 10 and 11, the plurality of touch signal lines 22 include a plurality of wire sub-segments 23 extending in the second direction X.

In the plurality of wire sub-segments 23 extending in the second direction X, part of the wire sub-segments 23 are located in the first transition region B11 (for example, the part of the wire sub-segments 23 are located in the first fan-out region B111 (see FIG. 4)), and part of the wire sub-segments 23 are located in the second transition region B13 (for example, the part of the wire sub-segments 23 are located in the second fan-out region B131 (see FIG. 4)).

Figure 8:
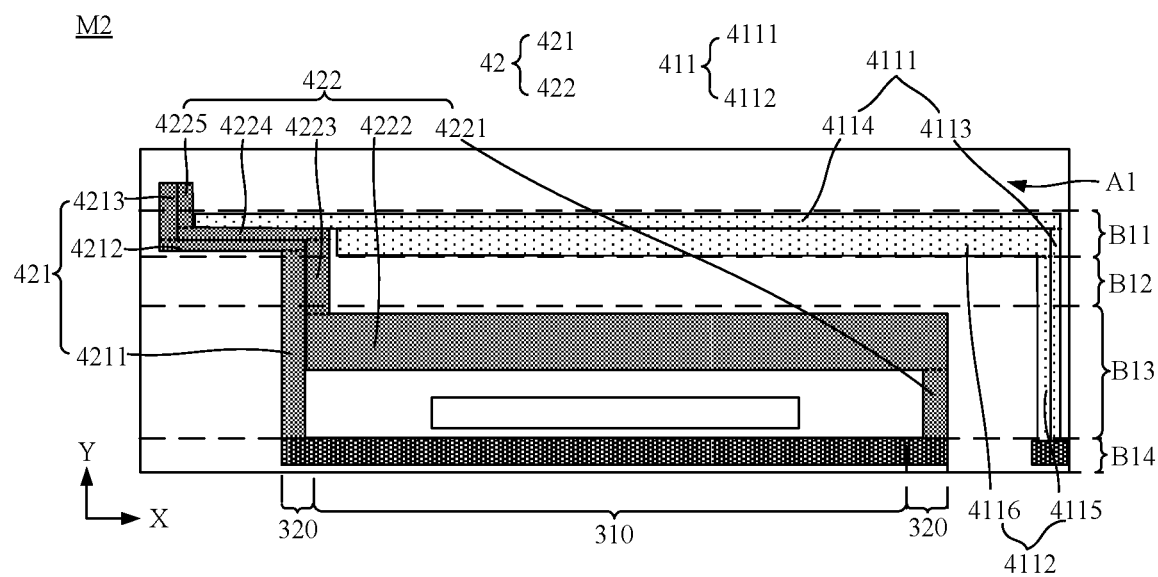
FIG. 8 is a partial enlargement view of the region M2 in FIG. 2B.

In this case, as shown in FIGS. 2A, 8 and 10, part of the plurality of wire sub-segments 23 extending in the second direction X are located in the first transition region B11, and part of the plurality of wire sub-segments 23 extending in the second direction X are located in the second transition region B13, so that the number of wire sub-segments 23 extending in the second direction X located in the first transition region B11 may be reduced, and thus the wire width (cross-section) of the wire sub-segments 23 extending in the second direction X located in the first transition region B11 may be increased. Thus, the impedances of touch signal lines 22 including the wire sub-segments 23 extending in the second direction X located in the first transition region B11 are reduced, and the overall touch performance of the display apparatus 1000 is improved. In addition, since the second transition region B13 is located on a side of the bending region B12 away from the display region A1 (that is, the second transition region B13 will be bent to a side of the non-light-exit surface of the display panel 10), the size of the second transition region B13 will not affect the narrow bezel design of the display apparatus 1000. In this way, the wire width (cross-section) of the wire sub-segments 23 extending in the second direction X located in the second transition region B13 may also be increased. Thus, the impedances of touch signal lines 22 including the wire sub-segments 23 extending in the second direction X located in the second transition region B13 are reduced, and the overall touch performance of the display apparatus 1000 (see FIG. 1) is improved.

For example, referring to FIGS. 4, 5A and 6A, the plurality of touch signal lines 22 include a plurality of first touch wires 221 and a plurality of second touch wires 222. The plurality of first touch wires 221 are electrically connected to the touch structure 21 on a first side of the touch region A2, and the plurality of second touch wires 222 are electrically connected to the touch structure 21 on a second side of the touch region A2. The first side is a side of the touch region A2 proximate to the first transition region B11, and the second side is at least one side of the touch region A2 in the second direction X.

Referring to FIGS. 6A and 10, the first touch wire 221 includes a first wire sub-segment 231 that extends in the second direction X and is located in the first transition region B11. The second touch wire 222 includes a second wire sub-segment 232 that extends in the second direction X and is located in the second transition region B13.

With such arrangement, crossing between the plurality of first touch wires 221 and the plurality of second touch wires 222 may be avoided, wiring complexity of the plurality of first touch wires 221 and the plurality of second touch wires 222 may be simplified, and fabrication cost is reduced.

For example, as shown in FIGS. 2B and 6A, the plurality of touch signal lines 22 include a plurality of wire harnesses 40, and each wire harness 40 is composed of touch signal lines 22 connected to one second bonding sub-part 320 (see FIG. 7). The plurality of wire harnesses 40 include a plurality of first wire harnesses 41 and a plurality of second wire harnesses 42. Each first wire harness 41 is composed of first touch wires 221, and each second wire harness 42 is composed of second touch wires 222. The plurality of second wire harnesses 42 are located on opposite sides of the plurality of first wire harnesses 41.

Figure 6B:
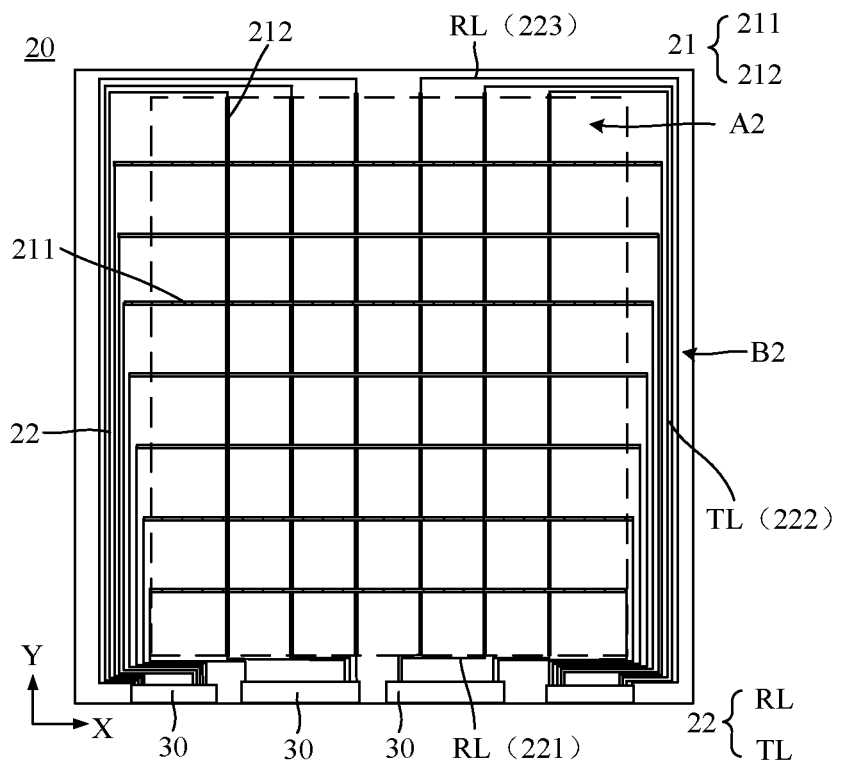
FIG. 6B is a structural diagram of yet another touch sensing layer, in accordance with some embodiments.

In addition, referring to FIGS. 5B and 6B, the plurality of touch signal lines 22 can further include a plurality of third touch wires 223 electrically connected to the touch structure 21 on a third side of the touch region A2. The third side is another side of the touch region A2 opposite to the first side. At least one third touch wire 223 can include a third wire sub-segment (not shown in FIGS. 5B and 6B) that extends in the second direction X and is located in the second transition region B13.

With such arrangement, crossing between the plurality of first touch wires 221, the plurality of second touch wires 222 and the plurality of third touch wires 223 may be avoided, wiring complexity of the plurality of first touch wires 221, the plurality of second touch wires 222 and the plurality of third touch wires 223 may be simplified, and fabrication cost is reduced.

For example, the plurality of wire harnesses 40 further include a plurality of third wire harnesses, and each third wire harness is composed of third touch wires 223. The plurality of third wire harnesses are located on opposite sides of the plurality of second wire harnesses 42.

It can be understood that, in the case where the plurality of driving electrodes 211 are arranged in the first direction Y and the plurality of sensing electrodes 212 are arranged in the second direction X, both the first touch wire 221 and the third touch wire 223 are electrically connected to the sensing electrode 212, and the second touch wire 222 is electrically connected to the driving electrode 211. That is, the first touch signal lines RL include the first touch wires 221 and the third touch wires 223, and the second touch signal lines TL includes second touch wires 222.

In the case where the plurality of driving electrodes 211 are arranged in the second direction X and the plurality of sensing electrodes 212 are arranged in the first direction Y, both the first touch wire 221 and the third touch wire 223 are electrically connected to the driving electrode 211, and the second touch wire 222 is electrically connected to the sensing electrode 212. That is, the first touch signal lines RL include the second touch wires 222, and the second touch signal lines TL include the first touch wires 221 and the third touch wires 223.

Some embodiments of the present disclosure are schematically described below by taking an example in which the plurality of touch signal lines 22 include the plurality of first touch wires 221 and the plurality of second touch wires 222.

In some embodiments, referring to FIGS. 2B and 4, the light-exit surface of the display panel 10 is in a shape of a rectangle, and two corners of the display panel 10 proximate to the first transition region B11 are arc-shaped corners.

In this case, as shown in FIGS. 6A and 8, the plurality of second wire harnesses 42 include a plurality of first sub-harnesses 422 and a plurality of second sub-harnesses 421, the second sub-harness 421 and the first sub-harness 422 each is composed of at least one second touch wire 222, and the second sub-harness 421 is located on a side of the first sub-harness 422 away from the plurality of first wire harnesses 41.

For example, as shown in FIGS. 2B and 8, the display panel 10 includes a first bonding part 31, a second bonding part 32, a third bonding part 33 and a fourth bonding part 34 that are arranged in sequence in the second direction X. Each bonding part 30 includes a first bonding sub-part 310 and two second bonding sub-parts 320, and the two second bonding sub-parts 320 are disposed on opposite sides of the first bonding sub-part 310 in the second direction X.

Here, as shown in FIGS. 2B and 8, the second sub-harnesses 421 are electrically connected to the second bonding sub-part 320, farther away from the fourth bonding part 34, of the first bonding part 31, and are electrically connected to the second bonding sub-part 320, farther away from the first bonding part 31, of the fourth bonding part 34.

In addition, as shown in FIGS. 2B and 8, the first sub-harnesses 422 are electrically connected to the second bonding sub-part 320, closer to the fourth bonding part 34, of the first bonding part 31, and are electrically connected to the second bonding sub-part 320, closer to the first bonding part 31, of the fourth bonding part 34.

On this basis, structures of the first sub-harness 422 and the second sub-harness 421 are different.

For example, as shown in FIGS. 2B and 8, the first sub-harness 422 includes a first sub-harness segment 4221, a second sub-harness segment 4222, a third sub-harness segment 4223, a fourth sub-harness segment 4224, and a fifth sub-harness segment 4225 that are connected in sequence.

An end of the first sub-harness segment 4221 is electrically connected to the second bonding sub-part 320, and another end of the first sub-harness segment 4221 extends to the second transition region B13 in the first direction Y. The second sub-harness segment 4222 extends in the second direction X and is located in the second transition region B13. The third sub-harness segment 4223 extends to the first transition region B11 in the first direction Y. The fourth sub-harness segment 4224 extends in the second direction X and is located in the first transition region B11. The fifth sub-harness segment 4225 extends in the first direction Y and is electrically connected to the touch structure 21 (see FIG. 6A) on a side of the touch region A2 in the second direction X.

In this case, referring to FIGS. 8 and 10, the wire sub-segments 23 extending in the second direction X located in the first transition region B11 include wire sub-segments 23 of the fourth sub-harness segment 4224. The wire sub-segments 23 extending in the second direction X located in the second transition region B13 include wire sub-segments 23 of the second sub-harness segment 4222.

For example, as shown in FIGS. 2B and 8, the second sub-harness 421 includes a sixth sub-harness segment 4211, a seventh sub-harness segment 4212, and an eighth sub-harness segment 4213 that are connected in sequence.

An end of the sixth sub-harness segment 4211 is electrically connected to the second bonding sub-part 320, and another end of the sixth sub-harness segment 4211 extends to the first transition region B11 in the first direction Y. The seventh sub-harness segment 4212 extends in the second direction X and is located in the first transition region B11. The eighth sub-harness segment 4213 extends in the first direction Y and is electrically connected to the touch structure 21 (see FIG. 6A) on a side of the touch region A2 in the second direction X.

In this case, referring to FIGS. 8 and 10, the wire sub-segments 23 extending in the second direction X located in the first transition region B11 further include wire sub-segments 23 of the seventh sub-harness segment 4212.

Figure 9:
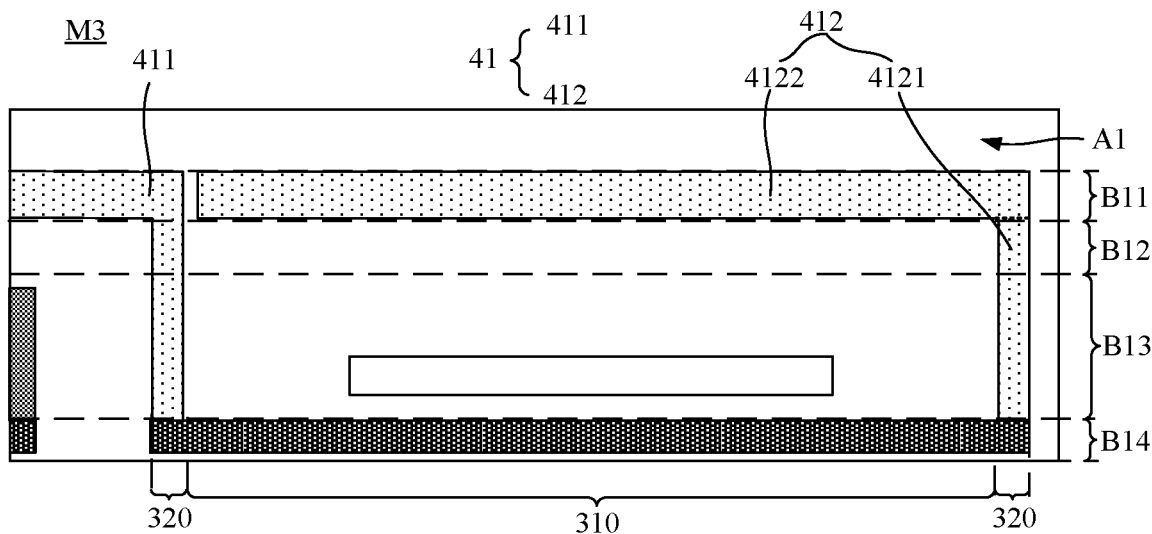
FIG. 9 is a partial enlargement view of the region M3 in FIG. 2B.

In addition, as shown in FIGS. 2B, 8 and 9, the plurality of first wire harnesses 41 include two third sub-harnesses 411 and a plurality of fourth sub-harnesses 412, and the two third sub-harnesses 411 are disposed on opposite sides of the plurality of fourth sub-harnesses 412, respectively.

For example, as shown in FIGS. 2B and 8, the display panel 10 includes a first bonding part 31, a second bonding part 32, a third bonding part 33 and a fourth bonding part 34 that are arranged in sequence in the second direction X. Each bonding part 30 includes a first bonding sub-part 310 and two second bonding sub-parts 320, and the two second bonding sub-parts 320 are disposed on opposite sides of the first bonding sub-part 310 in the second direction X.

Here, as shown in FIGS. 2B and 9, the third sub-harnesses 411 are electrically connected to the second bonding sub-part 320, farther away from the fourth bonding part 34, of the second bonding part 32, and are electrically connected to the second bonding sub-part 320, farther away from the first bonding part 31, of the third bonding part 33.

In addition, as shown in FIGS. 2B and 9, the fourth sub-harnesses 412 are electrically connected to the second bonding sub-part 320, closer to the fourth bonding part 34, of the second bonding part 32, and are electrically connected to the second bonding sub-part 320, closer to the first bonding part 31, of the third bonding part 33.

On this basis, structures of the third sub-harness 411 and the fourth sub-harness 412 are different.

For example, as shown in FIGS. 2B, 8 and 9, the third sub-harness 411 includes a first wire cluster 4111 and a second wire cluster 4112 that are arranged in parallel, and the first wire cluster 4111 is located on a side of the second wire cluster 4112 proximate to the plurality of fourth sub-harnesses 412. That is, the second wire cluster 4112 is located between the first wire cluster 4111 and the first sub-harness 422.

Referring to FIG. 8, the first wire cluster 4111 includes a first wire cluster segment 4113 and a second wire cluster segment 4114. An end of the first wire cluster segment 4113 is electrically connected to the second bonding sub-part 320, and another end of the first wire cluster segment 4113 extends to the first transition region B11 in the first direction Y. The second wire cluster segment 4114 extends in the second direction X to a border of the display region A1 and is located in the first transition region B11. The second wire cluster segment 4114 is electrically connected to the touch structure 21 (see FIG. 6A) on a side of the touch region A2 (see FIG. 6A) in the first direction Y, i.e., in the first transition region B11.

Referring to FIG. 8, the second wire cluster 4112 includes a third wire cluster segment 4115 and a fourth wire cluster segment 4116. An end of the third wire cluster segment 4115 is electrically connected to the second bonding sub-part 320, and another end of the third wire cluster segment 4115 extends to the first transition region B11 in the first direction Y. The fourth wire cluster segment 4116 extends in the second direction X and is located on a side of the third sub-harness segment 4223 away from the fifth sub-harness segment 4225. For example, the fourth wire cluster segment 4116 extends towards the correction between third sub-harness segment 4223 and the fourth sub-harness segment 4224 in the second direction X, and has a certain distance from the connection to avoid the short circuit between the fourth wire cluster segment 4116 and the third sub-harness segment 4223 or the fourth sub-harness segment 4224. The fourth wire cluster segment 4116 is located in the first transition region B11 and is electrically connected to the touch structure 21 (see FIG. 6A) on a side of the touch region A2 (see FIG. 6A) in the first direction Y, i.e., in the first transition region B11.

In this case, referring to FIGS. 10 and 11, the wire sub-segments 23 extending in the second direction X located in the first transition region B11 further include wire sub-segments 23 of the second wire cluster segment 4114 and wire sub-segments 23 of the fourth wire cluster segment 4116.

For example, as shown in FIG. 9, the fourth sub-harness 412 includes a ninth sub-harness segment 4121 and a tenth sub-harness segment 4122 that are connected in sequence.

An end of the ninth sub-harness segment 4121 is electrically connected to the second bonding sub-part 320, and another end of the ninth sub-harness segment 4121 extends to the first transition region B11 in the first direction Y. The tenth sub-harness segment 4122 extends in the second direction X and is electrically connected to the touch structure 21 (see FIG. 5A) in the first transition region B11.

In this case, referring to FIGS. 10 and 11, the wire sub-segments 23 extending in the second direction X located in the first transition region B11 further include wire sub-segments 23 of the tenth sub-harness segment 4122.

It should be noted that, referring to FIGS. 2B, 8 and 9, the display panel 10 has a first symmetry axis L extending in the first direction Y, and the first wire harness 41 and the second wire harness 42 are symmetrically arranged relative to the first symmetry axis L. With such arrangement, the wiring of the display panel 10 is more regular and the cost is lower.

It should be understood that, as shown in FIGS. 2B and 7, the display panel 10 further includes data lines, power supply signal lines, data connection lines DL and power supply connection lines VL.

The data line is disposed in the display region A1 and is electrically connected to the pixel circuit 130. The data connection line DL is disposed on a side of the display region A1 proximate to the bonding region B14 and is electrically connected to the data line and the data pin 312.

In addition, the power supply signal lines include first power supply signal lines. The first power supply signal line is disposed in the display region A1 and is electrically connected to the first electrode 121 of the light-emitting device 120, so as to provide the first power supply voltage signal Vdd for the light-emitting device 120.

On this basis, referring to FIG. 7, the power supply connection line VL is disposed on at least one side of the display region A1, and the power supply connection line VL is electrically connected to the first power supply signal line and at least one first power supply pin 313, or is electrically connected to the second electrode 123 of the light-emitting device 120 and at least one second power supply pin 314. Here, FIG. 7 only illustrates part of the power supply connection lines VL on the side of the first frame region B10 shown in FIG. 1.

In this case, referring to FIGS. 6A, 7 and 10, in the plurality of touch signal lines 22, an orthographic projection of the wire sub-segment 23 located in the second transition region B13 on a reference plane at least partially overlaps with an orthographic projection of the power supply connection line VL on the reference plane. Moreover, a film layer where the power supply connection lines VL are located is located between a film layer where the data connection lines DL are located and a film layer where the plurality of touch signal lines 22 are located, so as to function as signal shielding, reduce interference between the data connection line DL and the touch signal line 22, and improve the overall touch performance of the display apparatus 1000 (see FIG. 1).

It should be noted that the reference plane is a plane defined by the first direction Y and the second direction X.

For example, referring to FIGS. 2B and 3B, in a third direction Z, the display panel 10 includes the substrate 110, a first gate conductive layer GT1, a second gate conductive layer GT2, a first source-drain conductive layer SD1, a second source-drain conductive layer SD2, and the touch sensing layer 20. The third direction Z is perpendicular to the plane defined by the first direction Y and the second direction X.

Here, the reference plane may be a surface of the substrate 110 proximate to the first gate conductive layer GT1. The following description is made with reference to the drawings and using the substrate 110 instead of the reference plane.

As shown in FIGS. 3B, 5A and 7, the data connection lines DL are located in the first gate conductive layer GT1 and/or the second gate conductive layer GT2. The power supply connection lines VL are located in the first source-drain conductive layer SD1 and/or the second source-drain conductive layer SD2. The plurality of touch signal lines 22 are located in the touch sensing layer 20.

It will be understood that, an embodiment that an orthographic projection, on the substrate 110, of the wire sub-segment 23 located in the second transition region B13 in the plurality of touch signal lines 22 at least partially overlaps with an orthographic projection of the power supply connection line VL on the substrate 110 is not unique.

As shown in FIG. 7, the power supply connection lines VL include a plurality of first power supply connection lines VL1 and a plurality of second power supply connection lines VL2. The plurality of first power supply connection lines VL1 and the plurality of second power supply connection lines VL2 each are at least partially located in the second transition region B13.

In some embodiments, referring to FIGS. 5A, 7 and 10, in the plurality of touch signal lines 22, an orthographic projection, on the substrate 110 (see FIG. 3B), of a set line segment of the wire sub-segment 23 extending in the second direction X located in the second transition region B13 is located within a range of an orthographic projection of the first power supply connection line VL1 on the substrate 110 (see FIG. 3B).

It should be noted that the set line segment of the wire sub-segment 23 extending in the second direction X located in the second transition region B13 can be, for example, a portion of the wire sub-segment 23 located between two groups of first power supply pins 313 that are arranged at an interval in the same bonding part 30.

For example, referring to FIGS. 2B and 7, the display panel 10 includes a plurality of bonding parts 30 disposed in the bonding region B14, and each bonding part 30 includes a first bonding sub-part 310. The first bonding sub-part 310 includes a plurality of display pins 311, and the plurality of display pins 311 include two first power supply pin groups 313' arranged at an interval. Each first power supply pin group 313' includes at least one first power supply pin 313.

As shown in FIG. 7, the first power supply connection line VL1 includes a first connection sub-segment VL11, a second connection sub-segment VL12 and a third connection sub-segment VL13 that are connected in sequence. The first connection sub-segment VL11 and the third connection sub-segment VL13 extend in the first direction Y, and are connected to the two first power supply pin groups 313', respectively. The second connection sub-segment VL12 extends in the second direction X.

On this basis, referring to FIGS. 5A, 7 and 10, in the plurality of touch signal lines 22, an orthographic projection, on the substrate 110 (see FIG. 3B), of a set line segment of the wire sub-segment 23 extending in the second direction X located in the second transition region B13 is located within a range of an orthographic projection of the second connection sub-segment VL12 on the substrate 110 (see FIG. 3B).

In some embodiments, referring to FIGS. 5A, 7 and 10, in the plurality of touch signal lines 22, an orthographic projection, on the substrate 110 (see FIG. 3B), of a set line segment of the wire sub-segment 23 extending in the first direction Y located in the second transition region B13 is located within a range of an orthographic projection of the second power supply connection line VL2 on the substrate 110 (see FIG. 3B).

It should be noted that the set line segment of the wire sub-segment 23 extending in the first direction Y located in the second transition region B13 can be, for example, a portion of the wire sub-segment 23 farther away from the touch pin 321 connected to the wire sub-segment 23.

For example, referring to FIGS. 2B and 7, the display panel 10 includes a plurality of bonding parts 30 disposed in the bonding region B14, and each bonding part 30 includes a first bonding sub-part 310. The first bonding sub-part 310 includes a plurality of display pins 311, and the plurality of display pins 311 include two second power supply pin groups 314' arranged at an interval. Each second power supply pin group 314' includes at least one second power supply pin 314.

As shown in FIG. 7, the second power supply connection line VL2 includes a fourth connection sub-segment VL21 and a fifth connection sub-segment VL22 that are connected in sequence. The fourth connection sub-segment VL21 extends in the first direction Y. An end of the fifth connection sub-segment VL22 is connected to the fourth connection sub-segment VL21, and another end of the fifth connection sub-segment VL22 is electrically connected to the second power supply pin group 314'.

On this basis, as shown in FIGS. 5A, 7 and 10, in the plurality of touch signal lines 22, an orthographic projection, on the substrate 110 (see FIG. 3B), of a set line segment of the wire sub-segment 23 extending in the first direction Y located in the second transition region B13 is located within a range of an orthographic projection of the fourth connection sub-segment VL21 on the substrate 110 (see FIG. 3B).

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A touch display module, comprising:
    a display panel having a display region, a first transition region, a bending region, a second transition region and a bonding region arranged in sequence in a first direction;
    a touch structure formed with a touch region, wherein the touch region covers the display region, and the first transition region is located on a side of the touch region in the first direction; and
    a plurality of touch signal lines including a plurality of wire sub-segments extending in a second direction, wherein the second direction intersects the first direction; and in the plurality of wire sub-segments, part of the wire sub-segments are located in the first transition region, and part of the wire sub-segments are located in the second transition region;
    wherein the plurality of touch signal lines include:
        a plurality of first touch wires electrically connected to the touch structure on a first side of the touch region, wherein the first side is a side of the touch region proximate to the first transition region; a first touch wire includes a first wire sub-segment that extends in the second direction and is located in the first transition region; and
        a plurality of second touch wires electrically connected to the touch structure on a second side of the touch region, wherein the second side is at least one side of the touch region in the second direction; at least one second touch wire includes a second wire sub-segment that extends in the second direction and is located in the second transition region;
    wherein the display panel includes a plurality of bonding parts disposed in the bonding region, and each bonding part includes a first bonding sub-part and two second bonding sub-parts; the first bonding sub-part includes a plurality of display pins, a second bonding sub-part of the two second bonding sub-parts includes a plurality of touch pins, and a touch signal line is electrically connected to a touch pin; and the two second bonding sub-parts are disposed on opposite sides of the first bonding sub-part in the second direction; and
    wherein the plurality of touch signal lines further include a plurality of wire harnesses, and each wire harness is composed of touch signal lines connected to one second bonding sub-part; the plurality of wire harnesses include a plurality of first wire harnesses and a plurality of second wire harnesses; each first wire harness is composed of first touch wires, and each second wire harness is composed of second touch wires; and the plurality of second wire harnesses are located on opposite sides of the plurality of first wire harnesses.

2. The touch display module according to claim 1, wherein the plurality of second wire harnesses include a plurality of first sub-harnesses, and a first sub-harness is composed of at least one second touch wire; the first sub-harness includes a first sub-harness segment, a second sub-harness segment, a third sub-harness segment, a fourth sub-harness segment, and a fifth sub-harness segment that are connected in sequence;
    an end of the first sub-harness segment is electrically connected to a second bonding sub-part of a bonding part, and another end of the first sub-harness segment extends to the second transition region in the first direction; the second sub-harness segment extends in the second direction and is located in the second transition region; the third sub-harness segment extends to the first transition region in the first direction; the fourth sub-harness segment extends in the second direction and is located in the first transition region; and the fifth sub-harness segment extends in the first direction and is electrically connected to the touch structure on a side of the touch region in the second direction.

3. The touch display module according to claim 2, wherein the plurality of second wire harnesses further include a plurality of second sub-harnesses, and a second sub-harness is composed of at least one second touch wire; the second sub-harness includes a sixth sub-harness segment, a seventh sub-harness segment, and an eighth sub-harness segment that are connected in sequence;
    an end of the sixth sub-harness segment is electrically connected to another second bonding sub-part of the bonding part, and another end of the sixth sub-harness segment extends to the first transition region in the first direction; the seventh sub-harness segment extends in the second direction and is located in the first transition region; and the eighth sub-harness segment extends in the first direction and is electrically connected to the touch structure on a side of the touch region in the second direction.

4. The touch display module according to claim 3, wherein the second sub-harness is located on a side of the first sub-harness away from the plurality of first wire harnesses.

5. The touch display module according to claim 4, wherein the plurality of first wire harnesses include two third sub-harnesses, and a third sub-harness includes a first wire cluster and a second wire cluster that are arranged in parallel;

the first wire cluster includes a first wire cluster segment and a second wire cluster segment; an end of the first wire cluster segment is electrically connected to a second bonding sub-part of another bonding part, and another end of the first wire cluster segment extends to the first transition region in the first direction; the second wire cluster segment extends in the second direction to a border of the display region and is located in the first transition region, and the second wire cluster segment is electrically connected to the touch structure;

the second wire cluster includes a third wire cluster segment and a fourth wire cluster segment; an end of the third wire cluster segment is electrically connected to the second bonding sub-part of the another bonding part, and another end of the third wire cluster segment extends to the first transition region in the first direction; the fourth wire cluster segment extends in the second direction and is located on a side of the third sub-harness segment away from the fifth sub-harness segment; and the fourth wire cluster segment is located in the first transition region and is electrically connected to the touch structure.

6. The touch display module according to claim 5, wherein the second wire cluster is located between the first wire cluster and the first sub-harness.

7. The touch display module according to claim 5, wherein the plurality of first wire harnesses further include a plurality of fourth sub-harnesses, and a fourth sub-harness includes a ninth sub-harness segment and a tenth sub-harness segment that are connected in sequence;

an end of the ninth sub-harness segment is electrically connected to another second bonding sub-part of the another bonding part, and another end of the ninth sub-harness segment extends to the first transition region in the first direction; and the tenth sub-harness segment extends in the second direction and is electrically connected to the touch structure in the first transition region.

8. The touch display module according to claim 7, wherein the two third sub-harnesses are disposed on opposite sides of the plurality of fourth sub-harnesses, respectively.

9. The touch display module according to claim 8, wherein the plurality of bonding parts include a first bonding part, a second bonding part, a third bonding part and a fourth bonding part that are arranged in sequence in the second direction;

a second bonding sub-part, farther away from the fourth bonding part, of the first bonding part is electrically connected to a second sub-harness of the plurality of second sub-harnesses; and a second bonding sub-part, closer to the fourth bonding part, of the first bonding part is electrically connected to a first sub-harness of the plurality of first sub-harnesses;

a second bonding sub-part, farther away from the fourth bonding part, of the second bonding part is electrically connected to a third sub-harness of the two third sub-harnesses; and a second bonding sub-part, closer to the fourth bonding part, of the second bonding part is electrically connected to a fourth sub-harness of the plurality of fourth sub-harnesses;

a second bonding sub-part, farther away from the first bonding part, of the third bonding part is electrically connected to a third sub-harness of the two third sub-harnesses; and a second bonding sub-part, closer to the first bonding part, of the third bonding part is electrically connected to a fourth sub-harness of the plurality of fourth sub-harnesses;

a second bonding sub-part, farther away from the first bonding part, of the fourth bonding part is electrically connected to a second sub-harness of the plurality of second sub-harnesses; and a second bonding sub-part, closer to the first bonding part, of the fourth bonding part is electrically connected to a first sub-harness of the plurality of first sub-harnesses.

10. The touch display module according to claim 1, wherein the display panel has a first symmetry axis extending in the first direction, and the first wire harness and the second wire harness are symmetrically arranged relative to the first symmetry axis.

11. The touch display module according to claim 1, wherein the touch structure includes driving electrodes and sensing electrodes;

the first touch wire is electrically connected to a sensing electrode, and the second touch wire is electrically connected to a driving electrode; or the first touch wire is electrically connected to the driving electrode, and the second touch wire is electrically connected to the sensing electrode.

12. The touch display module according to claim 1, wherein the display panel further includes:

a plurality of data connection lines disposed on a side of the display region proximate to the bonding region; and a plurality of power supply connection lines disposed on at least one side of the display region;

wherein in the plurality of touch signal lines, an orthographic projection of a wire sub-segment located in the second transition region on a reference plane at least partially overlaps with an orthographic projection of a power supply connection line on the reference plane; a film layer where the plurality of power supply connection lines are located is located between a film layer where the plurality of data connection lines are located and a film layer where the plurality of touch signal lines are located; and the reference plane is a plane defined by the first direction and the second direction.

13. The touch display module according to claim 12, wherein the plurality of power supply connection lines include first power supply connection lines and second power supply connection lines, and the first power supply connection lines and the second power supply connection lines each are at least partially located in the second transition region;

in the plurality of touch signal lines, an orthographic projection, on the reference plane, of a set line segment of a wire sub-segment extending in the second direction located in the second transition region is located within a range of an orthographic projection of a first power supply connection line on the reference plane; and in the plurality of touch signal lines, an orthographic projection, on the reference plane, of a set line segment of a wire sub-segment extending in the first direction located in the second transition region is located within a range of an orthographic projection of a second power supply connection line on the reference plane.

14. The touch display module according to claim 13, wherein the plurality of display pins include two first power supply pin groups arranged at an interval; and each first power supply pin group includes at least one first power supply pin;

wherein the first power supply connection line includes a first connection sub-segment, a second connection sub-segment and a third connection sub-segment that are connected in sequence; the first connection sub-segment and the third connection sub-segment extend in the first direction, and are connected to the two first power supply pin groups, respectively; and the second connection sub-segment extends in the second direction;

in the plurality of touch signal lines, the orthographic projection, on the reference plane, of the set line segment of the wire sub-segment extending in the second direction located in the second transition region is located within a range of an orthographic projection of the second connection sub-segment on the reference plane.

15. The touch display module according to claim 13, wherein the plurality of display pins include two second power supply pin groups arranged at an interval; and each second power supply pin group includes at least one second power supply pin;

wherein the second power supply connection line includes a fourth connection sub-segment and a fifth connection sub-segment that are connected in sequence; the fourth connection sub-segment extends in the first direction; an end of the fifth connection sub-segment is connected to the fourth connection sub-segment, and another end of the fifth connection sub-segment is electrically connected to a second power supply pin group;

in the plurality of touch signal lines, the orthographic projection, on the reference plane, of the set line segment of the wire sub-segment extending in the first direction located in the second transition region is located within a range of an orthographic projection of the fourth connection sub-segment on the reference plane.

16. The touch display module according to claim 12, wherein in a third direction, the display panel includes a substrate, a first gate conductive layer, a second gate conductive layer, a first source-drain conductive layer, a second source-drain conductive layer, and a touch sensing layer; the third direction is perpendicular to the plane defined by the first direction and the second direction;

the data connection lines are located in the first gate conductive layer and/or the second gate conductive layer; the power supply connection lines are located in the first source-drain conductive layer and/or the second source-drain conductive layer; and the plurality of touch signal lines are located in the touch sensing layer.

17. A display apparatus, comprising a touch display module; the touch display module comprising:

a display panel having a display region, a first transition region, a bending region, a second transition region and a bonding region arranged in sequence in a first direction;

a touch structure formed with a touch region, wherein the touch region covers the display region, and the first transition region is located on a side of the touch region in the first direction; and a plurality of touch signal lines including a plurality of wire sub-segments extending in a second direction, wherein the second direction intersects the first direction; and in the plurality of wire sub-segments, part of the wire sub-segments are located in the first transition region, and part of the wire sub-segments are located in the second transition region;

wherein the plurality of touch signal lines include:

a plurality of first touch wires electrically connected to the touch structure on a first side of the touch region, wherein the first side is a side of the touch region proximate to the first transition region; a first touch wire includes a first wire sub-segment that extends in the second direction and is located in the first transition region; and a plurality of second touch wires electrically connected to the touch structure on a second side of the touch region, wherein the second side is at least one side of the touch region in the second direction; at least one second touch wire includes a second wire sub-segment that extends in the second direction and is located in the second transition region;

wherein the display panel includes a plurality of bonding parts disposed in the bonding region, and each bonding part includes a first bonding sub-part and two second bonding sub-parts; the first bonding sub-part includes a plurality of display pins, a second bonding sub-part of the two second bonding sub-parts includes a plurality of touch pins, and a touch signal line is electrically connected to a touch pin; and the two second bonding sub-parts are disposed on opposite sides of the first bonding sub-part in the second direction; and wherein the plurality of touch signal lines further include a plurality of wire harnesses, and each wire harness is composed of touch signal lines connected to one second bonding sub-part; the plurality of wire harnesses include a plurality of first wire harnesses and a plurality of second wire harnesses; each first wire harness is composed of first touch wires, and each second wire harness is composed of second touch wires; and the plurality of second wire harnesses are located on opposite sides of the plurality of first wire harnesses.

* * * * *